United States Patent
Larson

(10) Patent No.: US 8,432,804 B2
(45) Date of Patent: Apr. 30, 2013

(54) TRANSMITTING VIDEO STREAMS

(75) Inventor: Arnold W Larson, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1093 days.

(21) Appl. No.: 12/203,683

(22) Filed: Sep. 3, 2008

(65) Prior Publication Data

US 2009/0141800 A1 Jun. 4, 2009

Related U.S. Application Data

(60) Provisional application No. 61/004,652, filed on Nov. 29, 2007.

(51) Int. Cl.
G01R 31/08 (2006.01)
(52) U.S. Cl.
USPC ........................................... 370/235; 370/474
(58) Field of Classification Search ................. 370/235, 370/474, 498
See application file for complete search history.

(56) References Cited

U.S. PATENT DOCUMENTS

| | | | |
|---|---|---|---|
| 6,014,694 A | 1/2000 | Aharoni et al. | |
| 6,037,983 A | 3/2000 | Au et al. | |
| 6,124,881 A | 9/2000 | Terui et al. | |
| 6,263,020 B1 | 7/2001 | Gardos et al. | |
| 6,754,241 B1 * | 6/2004 | Krishnamurthy et al. | 370/537 |
| 6,826,178 B1 | 11/2004 | Leonard | |
| 6,992,707 B2 | 1/2006 | Obrador | |
| 7,154,951 B2 | 12/2006 | Wang | |
| 7,184,602 B2 | 2/2007 | Cohen et al. | |
| 2002/0021756 A1 * | 2/2002 | Jayant et al. | 375/240.16 |
| 2004/0093618 A1 * | 5/2004 | Baldwin et al. | 725/101 |
| 2005/0220188 A1 | 10/2005 | Wang | |
| 2006/0018379 A1 * | 1/2006 | Cooper | 375/240.12 |
| 2006/0222203 A1 * | 10/2006 | Mercier | 382/100 |
| 2006/0248559 A1 * | 11/2006 | Michener et al. | 725/67 |
| 2006/0263067 A1 * | 11/2006 | Kamataki | 386/112 |
| 2007/0058729 A1 * | 3/2007 | Yoshinari | 375/240.25 |
| 2007/0189401 A1 * | 8/2007 | Watson et al. | 375/259 |
| 2007/0286243 A1 * | 12/2007 | Olshansky et al. | 370/498 |
| 2007/0296854 A1 * | 12/2007 | Berkey et al. | 348/412.1 |
| 2008/0056383 A1 * | 3/2008 | Ueki et al. | 375/240.26 |
| 2009/0135906 A1 * | 5/2009 | Comer et al. | 375/240.12 |

* cited by examiner

*Primary Examiner* — Jung Park

(57) ABSTRACT

Systems, methods, and devices for transmitting video streams are described herein. One method of transmitting video streams includes coordinating transmission of intra-frames in a first video stream with transmission of intra-frames in a second video stream. The method further includes transmitting I-frames in the first and second video streams such that the I-frames do not overlap in the first and second video streams.

19 Claims, 6 Drawing Sheets

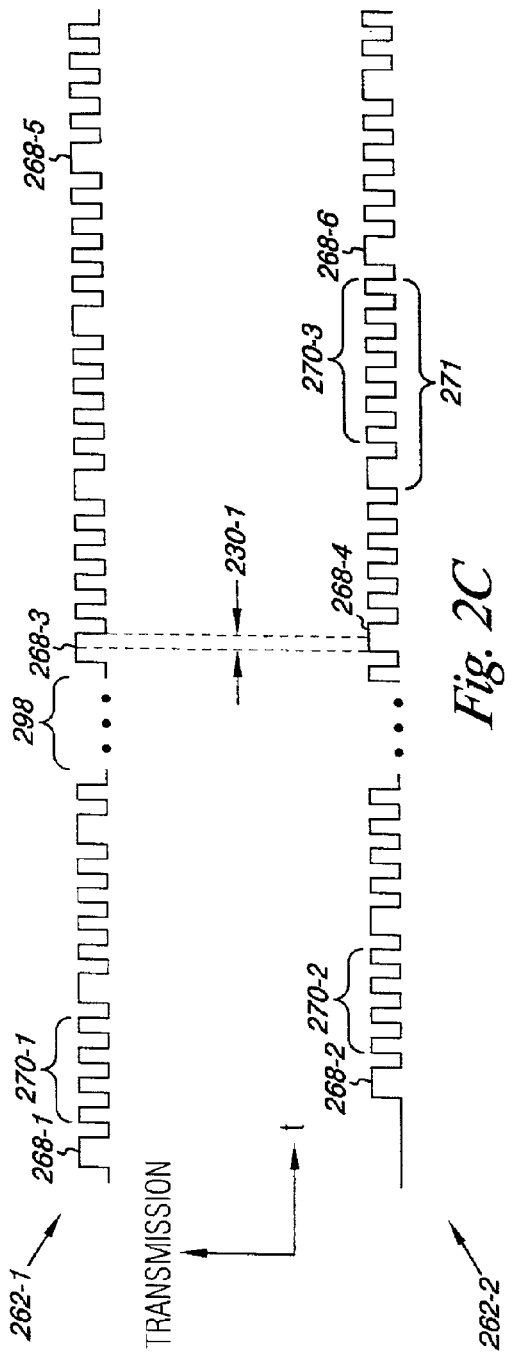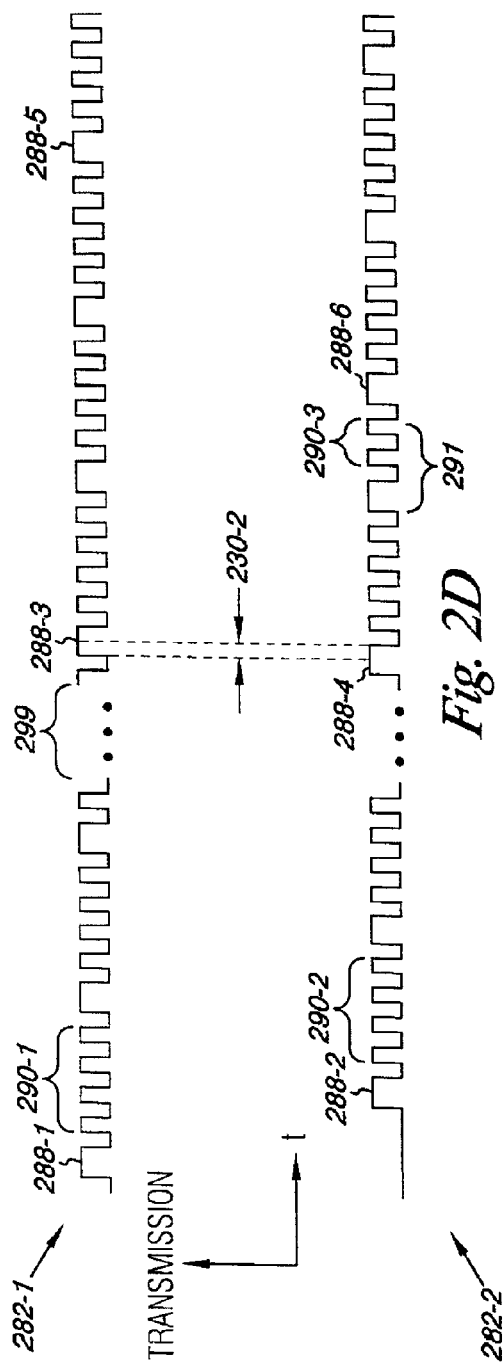

TRANSMITTING VIDEO STREAMS

CROSS-REFERENCE TO RELATED APPLICATIONS

This Application claims the benefit of U.S. Provisional patent application Ser. No. 61/004,652, filed Nov. 29, 2007, which is hereby incorporated by reference in it's entirety.

INTRODUCTION

Video encoding may, for instance, take an analog or digital video input signal and convert it to packets of digital data that can be transmitted over a communication network. Video streams can be divided into a series of pictures and compressed. Compressed video streams may include various groups of pictures that have a header and a series of pictures. A portion of the information in a picture within a group of pictures may be similar to a previous picture, particularly in applications such as video conferencing. Video conferencing may, for instance, include video of an individual who is located in one general position and is not moving much, other than to talk. Video conferencing may not involve scene changes, or marked color variation.

Video encoding may, in some implementations, take advantage of this situation by representing some pictures in terms of their differences from other pictures, rather than encoding each picture independently of other pictures. Pictures (e.g., frames) used in video encoding may, for instance, include intra-frames (i.e., I-frames) and predicted-frames (i.e., P-frames). I-frames may be coded using information only found in the picture itself. P-frames may be coded with respect to other P-frames or I-frames.

I-frames may have moderate compression ratios as compared to P-frames. P-frames may be compressed to higher compression ratios than I-frames. Due to the difference in compression ratios between I-frames and P-frames, among other factors, transmission of I-frames may occupy more bandwidth during transmission over the communications network. Increasing frequency of I-frames relative to P-frames may improve image quality of transmitted video streams. However, frequent encoding and transmission of I-frames may result in elevated bandwidth consumption due to, for instance, lower compression of I-frames increasing the size of the I-frames relative to P-frames, and the proportion of I-frames in the video stream.

Bandwidth management techniques may be set up to allow more than one data channel to transmit substantially simultaneous I-frames. To accommodate substantially simultaneous transmission of I-frames, a bandwidth management technique may, for instance, devote a substantially similar portion of bandwidth to each data channel. In some instances, bandwidth devoted to more than one data channel may be insufficient for transmission of substantially simultaneous I-frames such that the speed of transmission of the one or more I-frames may be decreased. The decreased transmission speed of I-frames in video streams may be experienced by a participant in a video conference, for instance, as latency in viewing other participants in the video conference.

BRIEF DESCRIPTION OF THE DRAWINGS

FIG. 2C illustrates a representation of video streams including a varied group of pictures size according to an embodiment of the present disclosure.

FIG. 2D illustrates a representation of video streams including a varied group of pictures size according to an embodiment of the present disclosure.

DETAILED DESCRIPTION

Figure 1:
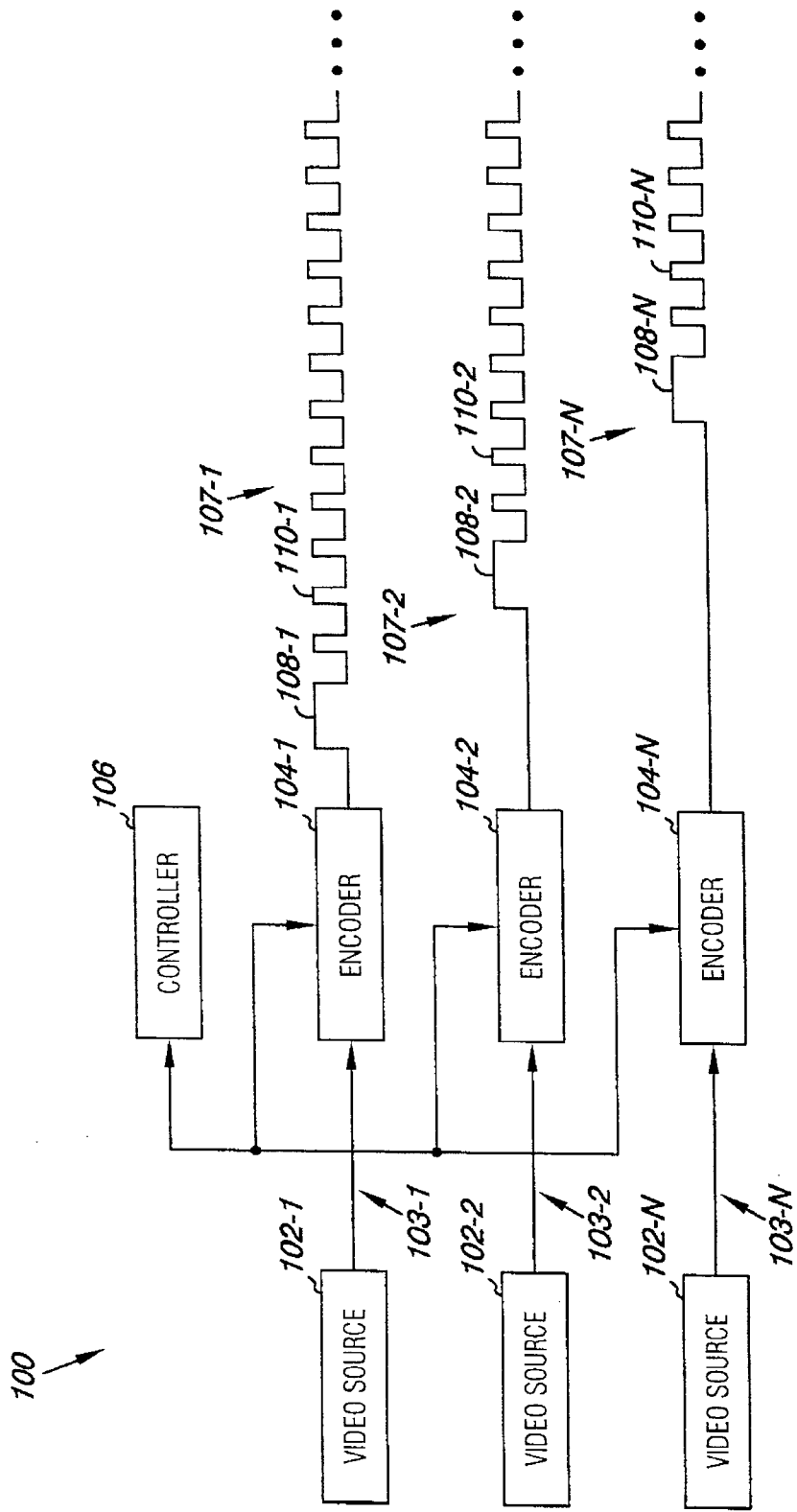
FIG. 1 illustrates a representation of a compressed video transmission system according to an embodiment of the present disclosure.

Video conferencing may, for instance, use multiple compressed video channels with reasonably predictable bandwidth requirements. Video conferencing may not have sudden scene changes that make use of frequent I-frame transmission. Bandwidth requirements during transmission of P-frames, for example, can be more than 50% lower than during transmission of I-frames. In some instances, bandwidth usage during P-frame transmission can be 10-20% of that used during I-frame transmission.

As used in the present disclosure, "P-frames" includes frame types other than I-frames, such as bidirectional-frames. Bidirectional-frames may, in some instances, use both a past and future picture as a reference, and may be compressed at a higher compression ratio than P-frames.

In some situations, an I-frame can include an amount of data greater than an amount of data transmittable within a bandwidth limit at a given frame rate. Motion Pictures Expert Group (MPEG) encoding, for instance, may assign 188 bytes per transport packet. There may be seven transport packets in one Real-time Transport Protocol (RTP) packet. A particular I-frame, for instance, may include 100 RTP packets. A particular transmission system may have a 33 milliseconds (msec) frame rate (i.e., one frame may be transmitted every 33 msec).

In this instance, a bandwidth of roughly 4 megabytes per second (MBPS) may allow transmission of all packets comprising the I-frame in one video frame at the given frame rate [(188 bytes/transport packet)×(7 transport packets/RTP packet)×(100 RTP packets)]÷(33 msec)≈3,987,879 bytes/second]. If less than 4 MBPS of bandwidth were available, in this instance, a remainder of the I-frame (i.e., unsent packets) may be transmitted with a later video frame. When transmission of the entire I-frame is not completed as one video frame at the given frame rate, then the viewer may experience latency.

Bandwidth requirements for transmitting compressed video streams may be affected when one transmission line, having a given bandwidth limit, is used to transmit multiple video streams. For instance, a communication network may have three compressed video streams that are transmitted over a shared transmission line having a given bandwidth limit. Some bandwidth management techniques have divided the bandwidth limit evenly between the three video streams. With such a technique, when the three video streams are each transmitting P-frames, bandwidth availability may not be fully utilized. For example, using the framework of the example described in the previous paragraph, if a P-frame were 10 percent as large as an I-frame (i.e. 10 RTP packets), and transmitted at the same rate (i.e., 4 MBPS), transmission of the P-frame could be completed in 3.3 msec. A subsequent P-frame may not be encoded until it is received from the source (e.g., 30 msec later), so the bandwidth may go unused.

When, for instance, two of the three video streams are each transmitting I-frames, their respective bandwidth allocation may simultaneously be fully utilized and insufficient to transmit each I-frame as one video frame, while the bandwidth allocation for the stream transmitting a P-frame may be sufficient, but not be fully utilized. In this instance, some bandwidth is unused while, at the same time, the communication network may have latency due to insufficient bandwidth allocated to transmit each I-frame as one video frame. As the reader will appreciate, transmission latency for a P-frame may be lower than for an I-frame in general, however the transmission latency for a stream can be established by the longest latency (e.g., greatest amount of time) for any frame transmitted.

Accordingly, among one or more embodiments of the present disclosure, a method of transmitting video streams can include coordinating transmission of I-frames in a first video stream with transmission of I-frames in a second video stream. The method can include transmitting I-frames in the first and second video streams such that the I-frames do not overlap in the first and second video streams.

FIG. 1 illustrates a representation of a compressed video transmission system according to an embodiment of the present disclosure. As illustrated in FIG. 1, system 100 can include a number of video sources 102-1, 102-2, 102-N. The designator N is used to indicate that any number of video sources can be included with the system 100. A video source 102 can, in one or more embodiments, use input received from a camera and/or another video source, among other input sources.

In one or more embodiments, output from each video source can be input to an encoder device. As illustrated in FIG. 1, each video source can output a video stream (e.g., an uncompressed video stream) to an encoder. For example, a video stream 103-1 output from video source 102-1 can be input to encoder 104-1, a video stream 103-2 output from video source 102-2 can be input to encoder 104-2, and a video stream 103-N output from video source 102-N can be input to encoder 104-N. An encoder (e.g., encoder 104-1) can be external or internal to a video source (e.g., video source 102-1).

The encoders 104-1, 104-2, 104-N can, in one or more embodiments, compress a signal from the video sources 102-1, 102-2, 102-N, respectively (e.g., by using MPEG encoding). Compressing a signal from a video source prior to transmission over a network can, for example, reduce bandwidth consumption by the transmitted signal. However, compressing a signal may reduce the quality of the signal. One or more encoding standards, for example MPEG-2, have been developed to lessen the reduction in quality that may occur with compression while, for example, enhancing compression ratios.

Encoders, as described in the present disclosure, can, in one or more embodiments, encode a video stream into groups of pictures that can include I-frames and P-frames. For applications such as video conferencing, some of the frames in a video sequence may be substantially similar due to, for example, a lack of characteristics that can include scene changes, fast moving objects, and/or significant color variation, among others. As such, a subsequent frame may bear substantial similarity to a previous frame.

Encoders can, in one or more embodiments, take advantage of this situation. For example, a group of pictures can begin with an I-frame, which can include a moderately compressed version of the original picture. Subsequent pictures can include a number of P-frames, which may be compressed to a higher compression ratio than I-frames and encoded, for example, based on surrounding P-frames and/or the nearest previous I-frame. The frequency of encoding I-frames with respect to P-frames can depend on, for example, the picture quality desired. A higher frequency of I-frames may yield a higher picture quality.

As illustrated in FIG. 1, the encoder 104 can output a video stream 107-1 (e.g., a compressed video stream) based upon input from the video source 102-1 (e.g., uncompressed video stream 103-1). In one or more embodiments, as illustrated in FIG. 1, the encoder 104-2 can output a video stream 107-2 (e.g., a compressed video stream) based upon input from the video source 102-2 (e.g., uncompressed video stream 103-2). In one or more embodiments, as illustrated in FIG. 1, the encoder 104-N can output a video stream 107-N (e.g., a compressed video stream) based upon input from the video source 102-N (e.g., uncompressed video stream 103-N).

In one or more embodiments, two or more uncompressed video streams 103-1, 103-2, 103-N, as illustrated in FIG. 1, having predictable bandwidth requirements, can be compressed into a number of I-frames 108-1, 108-2, 108-N and P-frames 110-1, 110-2, 110-N, respectively. As described in the present disclosure, encoders can operate to encode signals from video sources using a common group of pictures size.

As illustrated in FIG. 1, each encoder can function to transmit a video stream, however embodiments are not so limited. For example, a transmitter can be a component that is separate from an encoder. In addition, in one or more embodiments, a transmitter and/or an encoder can include, or be coupled with, a buffer for storing data prior to encoding and/or transmitting, as will be appreciated by one of ordinary skill in the art.

As illustrated in FIG. 1, each encoder 104-1, 104-2, 104-N can be coupled to, in one or more embodiments, a controller 106. The controller 106 can, in one or more embodiments, coordinate transmission of I-frames 108-1, 108-2, 108-N from the encoders 104-1, 104-2, 104-N. In one or more embodiments, a controller 106 can stagger initiation of encoding of I-frames 108-1, 108-2 for the first and second video sources 102-1, 102-2. The controller 106 can, in one or more embodiments, stagger initiation of video streams from the encoders such that transmission of I-frames in the video streams are non-overlapping. For example, the controller 106 can coordinate transmission such that an I-frame from only one encoder is allowed to transmit at any given time.

As shown in the embodiment of FIG. 1, video streams from encoders can be staggered such that I-frames do not overlap. By way of example and not by way of limitation, the video stream 107-1 from encoder 104-1 can start first, followed by video stream 107-2 from encoder 104-2, and then followed by video stream 107-N from encoder 104-N. Each video stream can include a group of pictures, which, in one or more embodiments, can include an I-frame and a number of P-frames. In one or more embodiments, the controller 106 can periodically vary a group of pictures size for at least one of the number of encoders to maintain synchronization against clock drift. In one or more embodiments, the plurality of encoders can provide coordination information to the controller 106.

In one or more embodiments, each encoder can continue to transmit more than one group of pictures such that after the end of the first group of pictures, a new group of pictures is transmitted, which can begin with another I-frame (not shown). Continuing coordination of transmission may be facilitated by, for example, encoding each video stream with a common number of pictures in their respective groups of pictures. Thus, I-frames can be generated by initiating encoding and by reaching the end of a group of pictures (e.g., starting a new group of pictures).

Initiation of video streams can be staggered such that I-frames do not transmit at the same time. I-frames can, in one or more embodiments, be compressed to a lower compression ratio than P-frames. For example, I-frames may use a larger amount of bandwidth than P-frames to transmit. One or more methods of maintaining synchronization of encoding and/or transmitting video streams may be implemented, for example, to transmit later I-frames in a non-overlapping fashion, as described in the present disclosure.

In one or more embodiments, limiting transmission to one I-frame at a given time from a number of encoders can, in one or more embodiments, be accomplished by staggering initiation of video streams. For example, a controller can stagger initiation of encoding of video signals from video sources, or, for example, a controller can stagger initiation of transmission of the video streams. In one or more embodiments, initiation of the encoding of the first and second video streams, for example, can be staggered. In embodiments where a controller staggers initiation of encoding of video signals by encoders, an encoder, after initiation, can encode and then transmit a video stream. Encoders using a staggered initiation of encoding may discard unused frames until transmission of the stream is initiated, for example.

In one or more embodiments, a controller can stagger initiation of transmission of video streams. For example, each encoder, after initiation, can transmit a video stream, which can have been previously encoded and/or stored in a transmit buffer. A buffer may be utilized prior to transmission of an initial I-frame (e.g., using staggered initiation of encoding) however, according to one or more embodiments of the present disclosure, the buffer is not needed to maintain synchronization after transmission of the initial I-frame. That is, once transmission has been initiated, a video stream is not buffered prior to transmission in one or more embodiments.

As described in the present disclosure, a transmitter can be a separate component from an encoder. In embodiments having separate transmission components, for example, an encoder can encode a signal from a video source and output the encoded signal to the separate transmission component. The separate transmission component can store information received from an encoder in a transmit buffer, for example, until the controller instructs initiation of transmission.

In one or more embodiments, initiation of transmission of the first and second video streams, for example, can be staggered. In one or more embodiments, a controller can stagger video streams by, for example, an interval proportional to the number of pictures per group of pictures divided by the number of video streams. For example, an embodiment can use a group of pictures size of 18, and three video sources. In such an embodiment, a controller can stagger initiation of video streams 107 by 18/3=6 pictures.

In this example, the controller can start the second video stream six frames after the first, and can start the third video stream twelve frames after the first. In this example, an I-frame can be transmitted at pictures 1, 6, and 12. The remaining pictures can be, for example, P-frames. Staggering transmission as such can provide leeway between the three I-frame transmissions. Hence, the ability of clock drift, or other signal variations, to affect the signals such that I-frames can begin to overlap can be reduced. That is, signal variations can affect a signal such that transmission changes by one or two frames, for example. However, in this example, transmission of I-frames is still non-overlapping due to the number of frames by which each signal is staggered.

As described in the present disclosure, two or more video streams can be compressed, in one or more embodiments, such that each of the video streams includes I-frames and P-frames. Transmission of each of the video streams can, for example, be staggered sequentially by a number of frames proportional to a group of pictures size divided by the number of video streams. Synchronization of transmission against potential clock drift in each of the plurality of video streams can, in one or more embodiments, be maintained.

In one or more embodiments, a controller may include logic for controlling a plurality of encoders. In this respect, the controller may possess a microprocessor, a micro-controller, an application specific integrated circuit, or the like. The controller may be interfaced with a memory configured to provide storage of a set of computer readable instructions in the form of software, firmware, and/or hardware that provides functionality. The interfaced memory may be implemented as a combination of volatile and non-volatile memory, such as dynamic random access memory ("RAM"), EEPROM, flash memory, or the like. It is also within the purview of the present invention that the memory may be included in the controller.

Figure 2A:
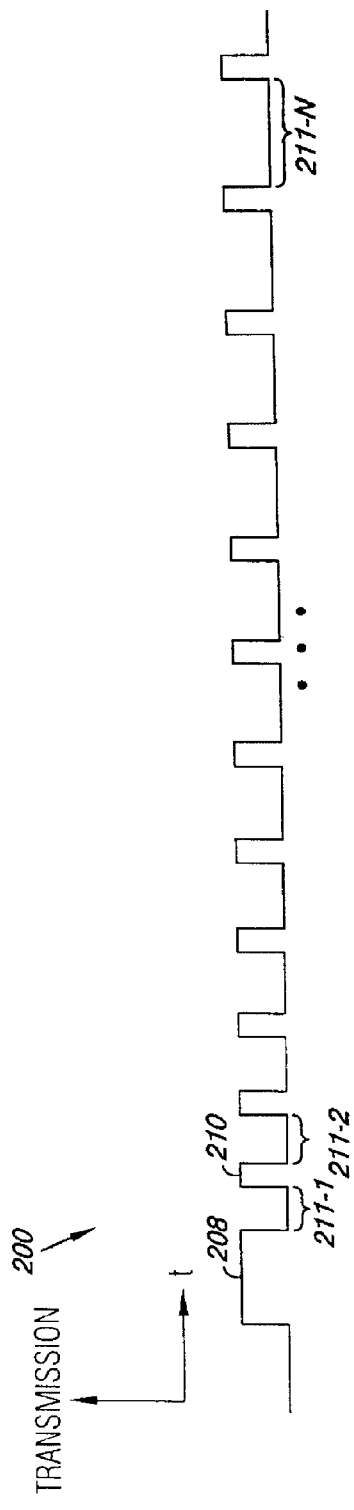
FIG. 2A illustrates a representation of a group of pictures including intra-frames and predicted-frames.

FIG. 2A illustrates a representation of a group of pictures including I-frames and P-frames. The vertical axis of the representation of the group of pictures 200 illustrated in FIG. 2A indicates if a signal is transmitting while the horizontal axis represents duration of the signal. The first frame in a group of pictures 200 can, in one or more embodiments, be an I-frame 208. The frames following the I-frame 208 can, in one or more embodiments, be P-frames, for example, the P-frame shown at 210.

MPEG-2, for instance, is a standard for encoding that can be used with one or more embodiments of the present disclosure. However, embodiments are not limited to any particular encoding standard. MPEG encoding, for instance, may include the use of I-frames and P-frames. With MPEG encoding, the frequency of I-frame encoding may be selected according to application-specific intent, for instance, quality of picture and/or variation of images, among others. Increasing a frequency of I-frame encoding with respect to P-frame encoding may, in some instances, result in a higher picture quality and increased bandwidth consumption.

As used in the present disclosure, an interval describes an amount of time that elapses between encoding and/or transmitting of different frames. Larger intervals may be used between encoding of later P-frames in group of pictures, at least partially as a result of later P-frames having more reference frames on which their encoding can be based.

FIG. 2A illustrates a number of intervals, 211-1, 211-2, . . . , 211-N, increasing in duration in the sequential group of pictures 200, although embodiments are not so limited. Allowing more time to elapse between encoding and/or transmitting frames can reduce bandwidth consumption, both in terms of transmission bandwidth of a communications network and compression bandwidth of an encoder. The group of pictures 200 illustrated in FIG. 2A, for example, includes one I-frame 208 and twelve P-frames 210, for a total group of pictures size of thirteen frames. Group of picture sizes are not so limited.

Figure 2B:
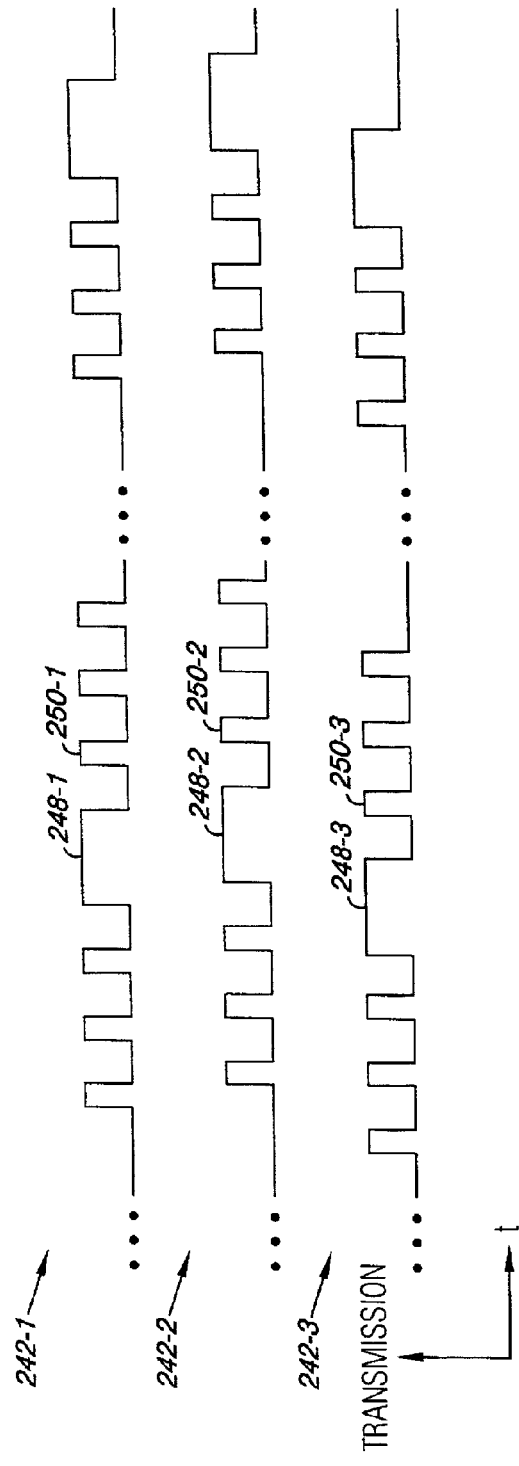
FIG. 2B illustrates a representation of clock drift in a compressed video stream including a group of pictures.

FIG. 2B illustrates a representation of clock drift in a compressed video stream including groups of pictures. The vertical axis of the representation of the groups of pictures 242-1, 242-2, 242-3 illustrated in FIG. 2B indicates if a signal is transmitting while the horizontal axis represents a duration of the signal. The first frame in a group of pictures 242-1, 242-2, 242-3 can, in one or more embodiments, be an I-frame 248-1, 248-2, 248-3. The frames following the I-frame 248-1, 248-2, 248-3 can, in one or more embodiments be P-frames, for example, the P-frames shown at 250-1, 250-2, 250-3. The representation of clock drift illustrated in FIG. 2B includes, by way of example and not by way of limitation, three video streams 242-1, 242-2, 242-3 showing a group of pictures.

Clock drift may result from a slight difference in signal speed in one video stream with respect to another signal speed in a second stream, or with respect to a "true" signal speed, that propagates over time. As used in the present disclosure with respect to clock drift, a "true" signal refers to a signal running at an exact frequency, unaffected by clock drift or other signal variations. For example, two or more signals can be initially synchronized, and running at the same frequency, but can drift apart from each other when synchronization is not maintained.

As shown in FIG. 2B, video stream 242-1 illustrates a group of pictures including an I-frame 248-1 and a representative P-frame 250-1 running at a "true" speed with no clock drift. Video stream 242-2 illustrates, for example, the same group of pictures, including the I-frame 248-2 and the representative P-frame 250-2 running at approximately the same frequency. However, video stream 242-2 has been affected by clock drift over a period of time and thus appears to have shifted slightly right (i.e., the video stream 242-2 is running slower than a "true" speed). Video stream 242-3 illustrates, for example, the same group of pictures including the I-frame 248-3 and the representative P-frame 250-3 running at approximately the same frequency. However, video stream 242-3 has been affected by clock drift over a period of time and thus appears to have shifted slightly left (i.e. video stream 242-3 is running faster than a "true" speed). That is, clock drift, for example, can cause a signal to run either slightly faster or slower than its intended speed.

In a video conferencing system, for example, clock drift can affect transmission of multiple streams that were originally synchronized. According to one or more embodiments of the present disclosure, multiple video streams can be initiated such that transmission of I-frames is non-overlapping. However, without some form of control, clock drift in the video conferencing systems can contribute to inadvertent transmission of large amounts of data (e.g., I-frames) from different channels at the same time, which can result in elevated bandwidth consumption and latency.

For example, groups of pictures in video streams 242-1, 242-2, and 242-3, illustrated in FIG. 2B, can represent three separate signals in a communications network, each intended to transmit I-frames 248-1, 248-2, 248-3 over the communications network such that the I-frames 248-1, 248-2, 248-3 do not overlap. For example, the signals can have been initially synchronized such that I-frames 248-1, 248-2, 248-3 were staggered so as not to transmit at the same time, as illustrated with respect to groups of pictures 107-1, 107-2, and 107-N in FIG. 1. However, the effects of clock drift can at least partially cause the signals to drift such that transmission of I-frames 248-1, 248-2, 248-3 overlaps between one or more groups of pictures in the video streams 242-1, 242-2, 242-3, respectively, as illustrated in FIG. 2B.

In one or more embodiments of the present disclosure, a first and a second video stream, for example, can be synchronized to reduce an effect of clock drift. Synchronizing can, in one or more embodiments, include varying at least one group of pictures size according to information provided from at least one video stream source. Synchronization of transmission can, in one or more embodiments, be maintained by varying the group of pictures size to reduce an effect of clock drift.

For example, a controller, such as controller 106 in FIG. 1, can receive a signal from one or more encoders (e.g., encoder 104-2 in FIG. 1) including information related to, at least, a number of frames encoded and/or transmitted. By way of example, and not by way of limitation, after a particular period of time, in one or more embodiments, the controller can compare a frame count for an encoder to allow detection of a variation in a number of frames actually transmitted and/or encoded from a number of frames that would be transmitted and/or encoded at a frequency at which the encoder is operating (e.g., as can be at least partially caused by clock drift affecting the encoder). In one or more embodiments the controller can maintain a running frame count for each encoder to allow detection of a variation in frame counts between the one or more encoders (e.g., as can be at least partially caused by clock drift affecting the one or more encoders).

As illustrated in FIGS. 2C and 2D, clock drift can, in one or more embodiments, be at least partially compensated for by varying the group of pictures size by a number of P-frames. In one or more embodiments, varying at least one group of pictures size can include periodically adding a number of extra P-frames to the group of pictures to reduce an effect of clock drift, as illustrated in FIG. 2C. In one or more embodiments, varying at least one group of pictures size can include periodically subtracting a number of P-frames per group of pictures to reduce an effect of clock drift, as illustrated in FIG. 2D.

FIG. 2C illustrates a representation of video streams including a varied group of pictures size according to an embodiment of the present disclosure. The vertical axis of the representation of the video streams 262-1 and 262-2 illustrated in FIG. 2C indicates if a signal is transmitting while the horizontal axis represents a duration of the signal. The video streams 262-1 and 262-2 can, in one or more embodiments, include a number of I-frames as represented by 268-1 and 268-2 respectively. The video streams 262-1 and 262-2 can include, for example, groups of P-frames represented by 270-1 and 270-2 respectively. Each group of P-frames on the left side of disconnect 298 includes, by way of example, and not by way of limitation, four P-frames. As the reader will appreciate, initiation of video streams 268-1 and 268-2 have been staggered, according to one or more embodiments of the present disclosure, so that I-frames do not overlap in the video streams (i.e., so that I-frames are transmitted at different times for the video streams).

The disconnect 298, illustrated in FIG. 2C, represents a passage of time. After disconnect 298, an I-frame 268-3 in video stream 262-1 can, for example, overlap with an I-frame 268-4 in video stream 262-2, as indicated by overlap 230-1. Overlap 230-1 can be caused, at least in part, by clock drift affecting, by way of example and not by way of limitation, video stream 262-2 such that it can drift with respect to video stream 262-1. In one or more embodiments, a controller can vary a group of pictures size by periodically adding a number of extra P-frames to the group of pictures to reduce an effect of clock drift. As illustrated in FIG. 2C, extra P-frames can be added to group of pictures 271. Group of pictures 271 includes a group 270-3 of six P-frames, instead of four P-frames as are shown in groups represented by group of P-frames 270-2. In one or more embodiments, after a number of P-frames are added to group of pictures 271, I-frames, for example I-frames 268-5 and 268-6 in video streams 262-1 and 262-2 respectively, can cease to overlap (i.e., synchronization can be reestablished).

Embodiments are not limited to the example illustrated in FIG. 2C. For example, one or more extra P-frames can be added to a compressed video stream, in one or more embodiments, to at least partially compensate for signal variations (e.g., clock drift) before the variation is significant enough that transmission of I-frames between one or more video streams begin to overlap. In one or more embodiments, one or more extra P-frames can be added to a compressed video stream periodically, for example, to at least partially preempt a signal variation (e.g., clock drift).

FIG. 2D illustrates a representation of video streams including a varied group of pictures size according to an embodiment of the present disclosure. The vertical axis of the representation of the video streams 282-1 and 282-2 illustrated in FIG. 2D indicates if a signal is transmitting while the horizontal axis represents a duration of the signal. The video streams 282-1 and 282-2 can, in one or more embodiments, include a number of I-frames as represented by 288-1 and 288-2 respectively. The video streams 282-1 and 282-2 can include, for example, groups of P-frames represented by 290-1 and 290-2 respectively. Each group of P-frames on the left side of disconnect 299 includes, by way of example, and not by way of limitation, four P-frames. As the reader will appreciate, initiation of video streams 288-1 and 288-2 have been staggered, according to one or more embodiments of the present disclosure, so that I-frames do not overlap in the video streams (i.e., so that I-frames are transmitted at different times for the video streams).

The disconnect 299, illustrated in FIG. 2D, represents a passage of time. After disconnect 299, an I-frame 288-3 in video stream 282-1 can, for example, overlap with an I-frame 288-4 in video stream 282-2, as indicated by overlap 230-2. Overlap 230-2 can be caused, at least in part, by clock drift affecting, by way of example and not by way of limitation, video stream 282-2 such that it can drift with respect to video stream 282-1. In one or more embodiments, a controller can vary a group of pictures size by periodically subtracting a number of extra P-frames from the group of pictures to reduce an effect of clock drift. As illustrated in FIG. 2D, a number of P-frames can be added to group of pictures 291. Group of pictures 291 includes a group 290-3 of two P-frames, instead of four P-frames as are shown in groups represented by group of P-frames 290-2. In one or more embodiments, after a number of P-frames are subtracted from group of pictures 291, I-frames, for example I-frames 288-5 and 288-6 in video streams 282-1 and 282-2 respectively, can cease to overlap (i.e., synchronization can be reestablished).

Embodiments are not limited to the example illustrated in FIG. 2D. For example, one or more extra P-frames can be subtracted from a compressed video stream, in one or more embodiments, to at least partially compensate for signal variations (e.g., clock drift) before the variation is significant enough that transmission of I-frames between one or more video streams begin to overlap. In one or more embodiments, one or more extra P-frames can be subtracted from a compressed video stream periodically, for example, to at least partially preempt a signal variation (e.g., clock drift).

Figure 3A:
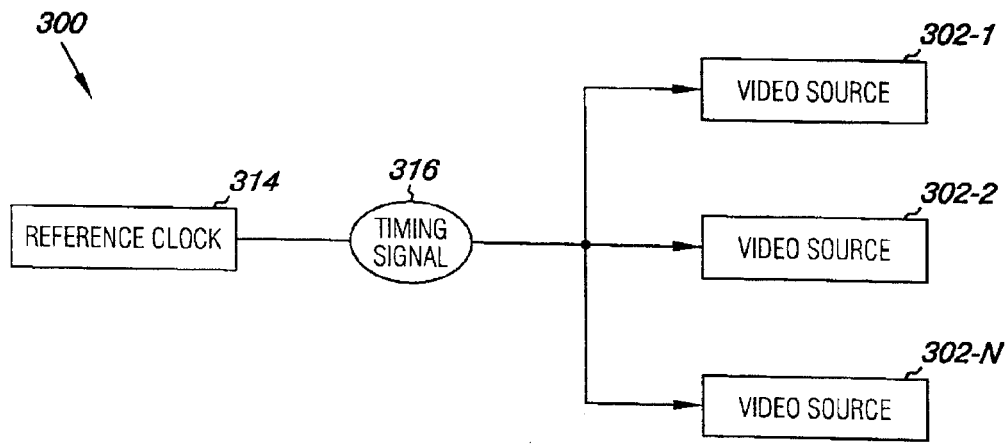
FIG. 3A illustrates a representation of a number of encoders generator locked by a reference clock according to an embodiment of the present disclosure.

FIG. 3A illustrates a representation of a number of video sources generator locked by a reference clock according to an embodiment of the present disclosure. As shown in representation 300 illustrated in FIG. 3A, a number of video sources 302-1, 302-2, 302-N can, in one or more embodiments, be generator locked (i.e., genlocked) by being linked to reference clock 314. A genlock can be used to synchronize signals (e.g., video sources) to at least partially reduce effects related to clock drift. In one or more embodiments, a genlock can be used for synchronizing, for example, a first and a second video stream. In one or more embodiments, a reference clock 314 can be used for synchronizing two or more video streams.

As illustrated in FIG. 3A, each video source (e.g., 302-1) can receive a timing signal 316 from the reference clock 314. The timing signal 316 from the reference clock 314 can, in one or more embodiments, be provided by a controller (e.g., 106 in FIG. 1). The timing of transmission of the respective signals from video sources 302-1, 302-2, 302-N can, in one or more embodiments, be synchronized by the timing signal 316 from the reference clock 314.

Clock drift may affect the reference clock 314. However, each video source (e.g., video source 302-1) can receive the same timing signal 316 from the reference clock 314. Thus, each video source's transmission can remain synchronized relative to other video sources even if the timing signal 316, on which that synchronization is based, drifts. That is, transmission by video sources may drift relative to a "true" frequency, but transmission by video sources do not drift with respect to each other. As such, the signals can remain synchronized, and encoding of an I-frame from one video source (e.g., video source 302-1) by an encoder (e.g., encoder 104-1 in FIG. 1) can be completed before encoding of an I-frame from another video source (e.g., video source 302-2) is initiated (e.g., by encoder 104-2 in FIG. 1).

Figure 3B:
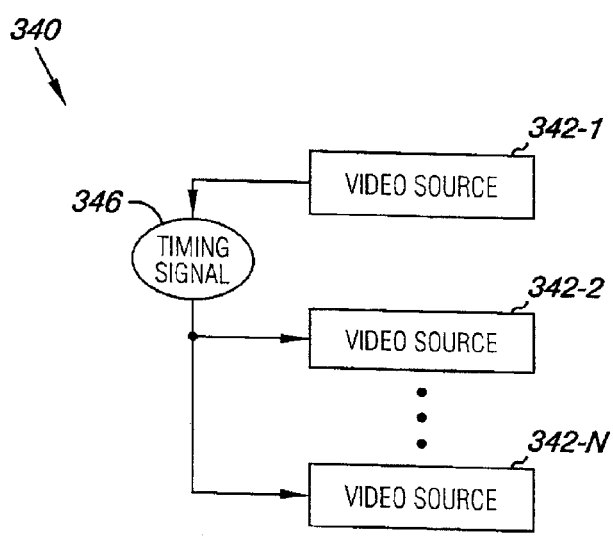
FIG. 3B illustrates a representation of a number of encoders generator locked to one encoder according to an embodiment of the present disclosure.

FIG. 3B illustrates a representation of a number of video sources generator locked to one video source according to an embodiment of the present disclosure. As shown in the representation 340 illustrated in FIG. 3B, a number of video sources (e.g., video source 342-2 and 342-N) can, in one or more embodiments, be genlocked to an other video source (e.g., 342-1) to maintain synchronization between the video sources 342-1, 342-2, 342-N. In one or more embodiments, a generator lock can be used for synchronizing, for example, the first and second video streams. In one or more embodiments, genlocking the two or more video streams to each other can use one of the video streams as a master video stream and the remainder of the video streams as slave video streams. As used in the present disclosure, an output from video source 342-1 is referred to as a master video stream (e.g., an uncompressed video stream), while outputs from the other video sources 342-2, 342-N are referred to as slave video streams (e.g., an uncompressed video streams). That is, video sources 342-2, 342-N can be slaved to master video source 342-1.

As illustrated in FIG. 3B, each video source 342-1, 342-2, 342-N can, in one or more embodiments, receive a timing signal 346 from video source 342-1. The timing of transmission of the respective signals from the slave video sources 342-2, 342-N can, accordingly, be synchronized by the timing signal 346 from the master video source 342-1.

Clock drift may affect the timing signal 346 from video source 342-1. However, each slave video source (e.g., video sources 342-2, 342-N) can receive the same timing signal 346 from the master video source 342-1. As such, each video source's transmission can remain synchronized relative to the other video sources even if the timing signal 346, on which that synchronization is based, drifts. That is, transmission by video sources 342-1, 342-2, 342-N may drift relative to a "true" frequency, but transmission by video sources 342-2 and 342-N does not drift with respect to video source 342-1 and each other. The signals remain synchronized.

Figure 4:
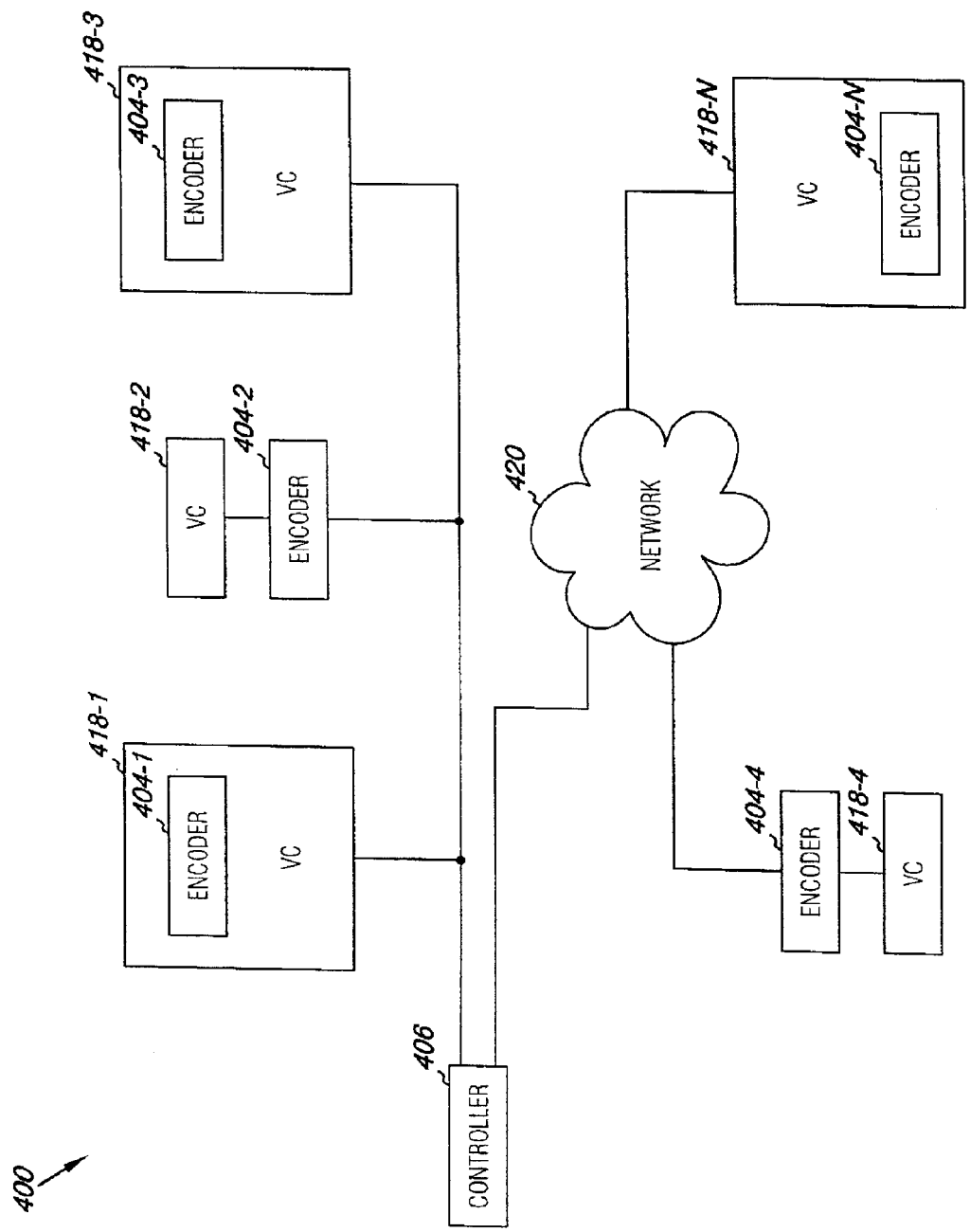
FIG. 4 illustrates an example of a videoconferencing network in which embodiments of the present disclosure can be implemented.

FIG. 4 illustrates an example of a videoconferencing network in which embodiments of the present disclosure can be implemented. The video conferencing network 400 illustrated in FIG. 4 can, in one or more embodiments, include a number of video conferencing terminals, for example, video conferencing terminals 418-1, 418-2, 418-3, 418-4, 418-N as presented in FIG. 4. The designator N is used to indicate that any number of video conferencing terminals can be connected and embodiments are not limited to the number represented in FIG. 4. In one or more embodiments, a compressed video transmission system (e.g., the video conferencing network 400) can be usable for videoconferencing. In one or more embodiments, the system can include video sources originating from different sites.

As described in the present disclosure, each video conferencing terminal can, in one or more embodiments, be coupled to an encoder. As illustrated in FIG. 4, an encoder can be external to the video conferencing terminal, for example, video conferencing terminals (VC) 418-2 and 418-4 with external encoders 404-2 and 404-4, respectively. An encoder can be internal to a VC, for example VC 418-1, 418-3, and 418-N with internal encoders 404-1, 404-3, and 404-N, respectively.

The encoders illustrated in FIG. 4 can function substantially as described with regard to FIGS. 1, 3A, and 3B. A number of video sources (not shown in FIG. 4) can be genlocked as described with regard to FIGS. 3A and 3B.

VCs 418-1, 418-2, 418-3 can, in one or more embodiments, be coupled to a controller 406, either directly as shown with VCs 418-1 and 418-3, or through an external encoder as shown with VC 418-2. The controller 406 can function substantially as described with regard to FIG. 1.

Video conferencing terminals can, in one or more embodiments, be interconnected to each other through a network 420, as illustrated in FIG. 4. The network 420 can be, for example, the Internet, a local area network, a wide area network, a metropolitan area network, an enterprise network, and/or another type of network supporting video conferencing. One example of an enterprise video conferencing network is Hewlett-Packard Development Company's Halo Video Exchange Network (HVEN).

Video conferencing terminals 418-1, 418-2, 418-3, as illustrated in FIG. 3, can be in a same location and connected to the network 420 collectively, in one or more embodiments, using one connection through the controller 406. In one or more embodiments, a video conference can involve video conferencing terminals from different sites, for example video conference terminals 418-4 and 418-N, as illustrated in FIG. 4. Transmission of video sources can be coordinated between the number of sites as described in the present disclosure.

In one or more embodiments, a compressed video transmission system can include two or more video sources. The compressed video transmission system can include two or more encoders individually coupled to the two or more video sources, where the two or more encoders compress output of the two or more video sources. The compressed video transmission system can also include a controller coupled to a number of the encoders, where the controller can coordinate encoding of the video sources such that transmission of an I-frame from, for example, a first video source is completed before a transmission of an I-frame from a second video source is initiated.

Some bandwidth management techniques for video conferencing may transmit video streams from video conferencing terminals through a network to, for instance, a video conferencing terminal without coordinating transmission of I-frames between terminals. Such bandwidth management techniques for video conferencing may allow more than one I-frame to transmit at substantially the same time.

Due at least partially to the larger size of I-frames with respect to P-frames, transmission of I-frames may fully consume the available bandwidth for transmission through the network. In such an instance, transmission of one or more signals containing I-frames may be delayed to account for limited bandwidth. Such a delay may cause a participant and/or view at a terminal to experience latency in one or more incoming signals. That is, there may be a noticeable delay in an incoming video image, as perceived by the participant and/or viewer of the terminal.

Latency related to insufficient bandwidth to transmit multiple video signals may be different than latency related to different distances over which a signal may be transmitted. A particular video conference may include terminals at different locations, for example, videoconferencing terminals 418-1, 418-4, and 418-N, as illustrated in FIG. 4. Signals sent substantially simultaneously from the three identified terminals may reach each of the other terminals in an amount of time substantially proportional to the distance between the terminals. That is, signals transmitted over longer distances may take longer to reach their destinations than signals transmitted over shorter distances. In contrast to latency related to transmission lengths, embodiments of the present disclosure may be used to reduce the effects of latency related to limited bandwidth.

Figure 5:
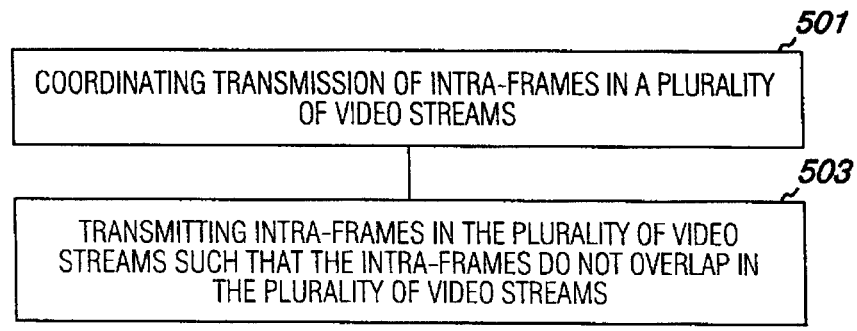
FIG. 5 is a block diagram illustrating a method of transmitting video streams according to an embodiment of the present disclosure.

FIG. 5 is a block diagram illustrating a method of transmitting video streams according to an embodiment of the present disclosure. Unless explicitly stated, the method embodiments described herein are not constrained to a particular order or sequence. Additionally, some of the described method embodiments, or elements thereof, can occur or be performed at the same, or at least substantially the same, point in time.

Embodiments described herein can be performed using logic, software, firmware, hardware, application modules, and ASICs, or combinations of these elements, and the like, to perform the operations described herein. Embodiments as described herein are not limited to any particular operating environment or to software/firmware coded and stored in a particular programming language.

The elements described can be resident on the systems, apparatuses, and/or devices shown herein, or otherwise. Logic suitable for performing embodiments of the present disclosure can be resident in one or more devices and/or locations. Processing devices used to execute operations described herein can include one or more individual modules that perform a number of functions, separate modules connected together, and/or independent modules.

The method embodiment illustrated in FIG. 5 includes coordinating transmission of I-frames in a plurality of video streams, as shown in block 501. The method further includes transmitting intra-frames in the plurality of video streams such that the intra-frames do not overlap in the plurality of video streams, as shown in block 503. In one or more embodiments, coordinating transmission of the video streams includes staggering initiation of encoding and/or transmission of the first and second video streams. The first and second video streams, in one or more embodiments can be synchronized (e.g. by using a generator lock) to reduce an effect of clock drift. In one or more embodiments, a group of pictures size for the first and/or second video streams can be varied (e.g., by subtracting and/or adding a P-frame).

Although specific embodiments have been illustrated and described herein, those of ordinary skill in the relevant art will appreciate that an arrangement calculated to achieve the same techniques can be substituted for the specific embodiments shown. This disclosure is intended to cover all adaptations or variations of one or more embodiments of the present disclosure.

It is to be understood that the above description has been made in an illustrative fashion, and not a restrictive one. Combination of the above embodiments, and other embodiments not specifically described herein, will be apparent to those of ordinary skill in the relevant art upon reviewing the above description.

The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure need to use more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method of transmitting video streams, comprising:
    coordinating transmission of intra-frames in a first video stream with transmission of intra-frames in a second video stream over a shared transmission line;
    transmitting intra-frames in the first and second video streams such that the intra-frames do not overlap between the first and second video streams during substantially simultaneous transmission of the first and second video streams over the shared transmission line;
    staggering initiation sequentially of the substantially simultaneous transmission over the shared transmission line of the first and second video streams by a number of frames proportional to a group of pictures size divided by a number of video streams in the first and second video streams; and
    maintaining synchronization of the transmission against potential clock drift in each of the first and second video streams such that the intra-frames within the first and second video streams do not overlap during the substantially simultaneous transmission of the first and second video streams over the same transmission line.

2. The method of claim 1, where coordinating transmission includes staggering initiation of encoding of the first and second video streams.

3. The method of claim 1, where the method includes synchronizing the first and second video streams to reduce an effect of clock drift.

4. The method of claim 3, where synchronizing includes using a generator lock for synchronizing the first and second video streams.

5. The method of claim 3, where synchronizing includes varying at least one group of pictures size according to information provided from at least one video stream source.

6. The method of claim 5, where varying at least one group of pictures size includes periodically adding a number of extra predicted-frames to the group of pictures to reduce the effect of clock drift.

7. The method of claim 5, where varying at least one group of pictures size includes periodically subtracting a number of predicted-frames per group of pictures to reduce the effect of clock drift.

8. A video transmission system, comprising:
    a plurality of video sources, each coupled to an encoder;
    a plurality of encoders for compressing at least two different video streams from the plurality of video sources to include intra-frames and predicted-frames, each encoder coupled to a controller;
    the controller having logic for controlling the plurality of encoders;
    wherein logic of the controller:
    staggers initiation sequentially of substantially simultaneous transmission over a same transmission line of the at least two different video streams by a number of frames proportional to a group of pictures size divided by a number of video streams in the at least two video streams; and
    maintains synchronization of the transmission against potential clock drift in each of the at least two video streams such that the intra-frames within the at least two video streams do not overlap during the substantially simultaneous transmission of the at least two video streams over the same transmission line.

9. The system of claim 8, where the controller includes logic embedded in a format selected from the group including:
    computer readable instructions in the form of software;
    computer readable instructions in the form of firmware; and
    hardware.

10. The system of claim 8, where logic maintains synchronization of transmission by genlocking the at least two video streams to each other using one of the at least two video streams as a master video stream and the remainder of the at least two video streams as slave video streams.

11. The system of claim 8, where logic maintains synchronization of transmission by using a reference clock for synchronizing the at least two video streams.

12. The system of claim 8, where logic maintains synchronization of transmission by instructing the plurality of encoders to vary the group of pictures size to reduce an effect of clock drift.

13. The system of claim 12, where logic periodically instructs the plurality of encoders to vary the group of pictures size by a number of predicted frames.

14. A compressed video transmission system, comprising:
    a plurality of video sources;
    a plurality of encoders coupled to the plurality of video sources, where the plurality of encoders compress output of the plurality of video sources; and
    a controller coupled to a number of the plurality of encoders, where the controller:
    coordinates encoding of the video sources such that transmission of an intra-frame from a first video source does not overlap with a transmission of an intra-frame from a second video source between at least two different video streams that are being substantially simultaneously transmitted over a same transmission line without having to buffer encoded video streams;
    staggers initiation sequentially of the substantially simultaneous transmission over the same transmission line of the at least two different video streams by a number of frames proportional to a group of pictures size divided by a number of video streams in the at least two video streams; and maintains synchronization of the transmission against potential clock drift in each of the at least two video streams such that the intra-frames within the at least two video streams do not overlap during the substantially simultaneous transmission of the at least two video streams over the same transmission line.

15. The system of claim 14, where the controller staggers initiation of encoding of intra-frames for the first and second video sources.

16. The system of claim 14, where the controller periodically varies a group of pictures size for at least one of the plurality of encoders to maintain synchronization against clock drift.

17. The system of claim 14, where the plurality of encoders provide coordination information to the controller.

18. The system of claim 14, where the system is usable for videoconferencing.

19. The system of claim 14, where the system includes video sources originating from different sites.

* * * * *